United States Patent
Lu et al.

(10) Patent No.: US 10,935,790 B2
(45) Date of Patent: Mar. 2, 2021

(54) ACTIVE FLEXIBLE LIQUID CRYSTAL OPTICAL DEVICES

(71) Applicant: Facebook Technologies, LLC, Menlo Park, CA (US)

(72) Inventors: Lu Lu, Menlo Park, CA (US); Junren Wang, Menlo Park, CA (US); Scott McEldowney, Menlo Park, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/270,355

(22) Filed: Feb. 7, 2019

(65) Prior Publication Data
US 2020/0257119 A1    Aug. 13, 2020

(51) Int. Cl.
| G02B 27/01 | (2006.01) |
| G02F 1/1345 | (2006.01) |
| G02F 1/13363 | (2006.01) |

(52) U.S. Cl.
CPC ..... *G02B 27/0172* (2013.01); *G02B 27/0176* (2013.01); *G02F 1/13363* (2013.01); *G02F 1/13452* (2013.01)

(58) Field of Classification Search
CPC ............ G02B 27/0172; G02B 27/0176; G02F 1/13452; G02F 1/13363
USPC .................................................. 349/123–131
See application file for complete search history.

(56) References Cited

U.S. PATENT DOCUMENTS

| 6,295,113 | B1 | 9/2001 | Yang | |
| 6,753,994 | B1* | 6/2004 | Russell | G02F 1/133305 359/254 |
| 6,992,718 | B1* | 1/2006 | Takahara | G02B 23/14 348/333.09 |
| 2003/0214229 | A1* | 11/2003 | Holman | G09G 3/3674 313/505 |
| 2005/0248705 | A1* | 11/2005 | Smith | G02B 5/3016 349/124 |
| 2006/0202162 | A1 | 9/2006 | Lin et al. | |
| 2007/0236640 | A1* | 10/2007 | Kimura | G02F 1/133514 349/141 |
| 2010/0270917 | A1* | 10/2010 | Chuang | G02F 1/13439 313/505 |

(Continued)

OTHER PUBLICATIONS

Y.R. Anusha, "Flexible Electronics an Overview," available on-line at URL: https://www.slideshare.net/AnushaYR/flexible-electronics-56603431, retrieved on Oct. 23, 2019, 14 pages.

(Continued)

*Primary Examiner* — Charles S Chang
(74) *Attorney, Agent, or Firm* — Millburn IP PLLC

(57) ABSTRACT

A device and a head-mounted display (HMD) are provided. The device comprises a first flexible electrode and a second flexible electrode configured to provide a driving voltage to the device; a birefringent material layer coupled to the first flexible electrode and the second flexible electrode, and structurally patterned to provide at least one predetermined optical function of the device; and a first photo-alignment (PAM) layer and a second PAM layer sandwiching the birefringent material layer. A structured pattern of the birefringent material layer is based on a manipulation of optic axis of birefringent material molecules in the birefringent material layer.

20 Claims, 8 Drawing Sheets

(56) References Cited

U.S. PATENT DOCUMENTS

| | | | | |
|---|---|---|---|---|
| 2011/0211135 | A1* | 9/2011 | Sharp | H04N 13/337 349/15 |
| 2012/0218325 | A1* | 8/2012 | Hiroki | H04N 13/398 345/697 |
| 2013/0293818 | A1* | 11/2013 | Murata | G02F 1/134363 349/141 |
| 2014/0226096 | A1 | 8/2014 | Taheri et al. | |
| 2015/0109248 | A1* | 4/2015 | Tokai | G06F 3/0412 345/174 |
| 2016/0011464 | A1* | 1/2016 | Kim | G02F 1/133753 349/106 |
| 2016/0216492 | A1* | 7/2016 | Yun | G03B 5/00 |
| 2016/0313769 | A1* | 10/2016 | Yoshitani | G06F 1/1635 |
| 2017/0218686 | A1 | 8/2017 | Galstian | |
| 2018/0337417 | A1* | 11/2018 | Kyu | F03G 7/005 |

OTHER PUBLICATIONS

Unknown Author, "Wearable device breakthrough: skin-like, thin-film transistors for flexible displays," originally published online at http://www.iamvr.co/ on Aug. 5, 2016, now available on-line at URL: https://web.archive.org/web/20160809162007/http://www.iamvr.co/wearable-device-breakthrough-skin-like/, retrieved on Feb. 3, 2020, 1 page.

Enterprise Canada, "Xerox Research Centre of Canada and NanoIntegris Advance Flexible Electronic Devices With Thin Film Transistor Package," published on-line on Jan. 26, 2016 at URL: http://www.mnialive.com/articles/xerox-research-centre-of-canada-and-nanointegris-advance-flexible-electronic-devices-with-thin-film-, retrieved on Oct. 23, 2019, 2 pages.

The Capasso Group at Harvard University, "Flat Lens for Visible Wavelengths," dated Jun. 4, 2016, available on-line at URL: https://www.seas.harvard.edu/capasso/2016/06/flat-lens-for-visible-wavelengths/, retrieved on Oct. 23, 2019, 2 pages.

The Capasso Group at Harvard University, "A metalens over a 60nm bandwidth in the visible," dated Mar. 27, 2017, available on-line at URL: https://www.seas.harvard.edu/capasso/2017/03/an-metalens-over-a-60nm-bandwidth-in-the-visible/, retrieved on Oct. 23, 2019, 5 pages.

She, A., et al., "Adaptive metalenses with simultaneous electrical control of focal length, astigmatism, and shift," Sciences Advances, Feb. 23, 2018, 4(2),eaap9957, also available on-line at URL: http://advances.sciencemag.org/content/4/2/eaap9957, retrieved on Oct. 23, 2019, 7 pages.

Stumpe, J., "Photochromatic Materials for Polarization und Diffractive Elements," dated May 31, 2012, available on-line at URL: https://tgzchemie.de/images/Donwload_PDF/Innovationsforum_Farbstoffe/Vortrag_Dr.J.Stumpe_Fraunhofer%20IAP_Potsdam.pdf, retrieved on Oct. 23, 2019, 24 pages.

Xiang, J., et al., "Electrooptic Response of Chiral Nematic Liquid Crystals with Oblique Helicoidal Director," Physical Review Letters, published May 2014, also available at URL: https://www.researchgate.net/publication/262302161_Electrooptic_Response_of_Chiral_Nematic_Liquid_Crystals_with_Oblique_Helicoidal_Director retrieved on Oct. 23, 2019, 15 pages.

Xiang, J., et al., "Liquid Crystals: Electrically Tunable Selective Reflection of Light from Ultraviolet to Visible and Infrared by Heliconical Cholesterics," Advanced Materials, 27(19), Mar. 2015, also available on-line at URL: https://www.researchgate.net/publication/274195441_Liquid_Crystals_Electrically_Tunable_Selective_Reflection_of_Light_from_Ultraviolet_to_Visible_and_Infrared_by_Heliconical_Cholesterics_Adv_Mater_192015, retrieved on Oct. 23, 2019, 6 pages.

Xiang, J., et al., "Electrically tunable laser based on oblique heliconical cholesteric liquid crystal," Proceedings of the National Academy of Sciences, Nov. 15, 2016, vol. 113, No. 46, pp. 12925-12928, 4 pages.

Alex Heath, "Facebook is working on futuristic smart glasses—here are new details," Business Insider, available on-line at URL: https://www.businessinsider.com/facebook-smart-glasses-ar-oculus-patent-2017-8, retrieve on Feb. 4, 2020, 4 pages.

International Search Report and Written Opinion dated Nov. 6, 2019 in International Application No. PCT/US2019/017219, filed Feb. 8, 2019 (12 pages).

Kazak, A. A., et al., "Controlled Diffraction Liquid-Crystal Structures with a Photoalignment Polymer," Technical Physics Letters, 2008, vol. 34, No. 10, pp. 861-863 (3 pages).

* cited by examiner

ACTIVE FLEXIBLE LIQUID CRYSTAL OPTICAL DEVICES

BACKGROUND

The present disclosure generally relates to display technologies and, specifically, relates to active and flexible liquid crystal (LC) optical devices.

Smart glasses are wearable computer glasses that superimpose information alongside or on real world images that the user sees, or that are able to change their optical properties in real time. Superimposing information onto a field of view in the smart glasses is often achieved through an optical head-mounted display (HMD) or a transparent heads-up display (HUD) that has the capability of reflecting projected digital images as well as allowing the user to see through it, or see better with it.

Futuristic smart glasses are highly desired to have good-looking, light-weight, colorless, and power efficient and, accordingly, optical components in the smart glasses are desired to be adaptive, light efficient and light-weight. Reducing the weight of optical components in augmented-reality (AR)/virtual-reality (VR)/mixed-reality (MR) HMDs is highly demanded. The disclosed devices are directed to solve one or more problems set forth above and other problems.

BRIEF SUMMARY OF THE DISCLOSURE

One aspect of the present disclosure provides a device. The device comprises a first flexible electrode and a second flexible electrode configured to provide a driving voltage to the device; a birefringent material layer coupled to the first flexible electrode and the second flexible electrode, and structurally patterned to provide at least one predetermined optical function of the device; and a first photo-alignment (PAM) layer and a second PAM layer sandwiching the birefringent material layer. A structured pattern of the birefringent material layer is based on a manipulation of optic axis of birefringent material molecules in the birefringent material layer.

Another aspect of the present disclosure provides a head-mounted display (HMD). The HMD comprises a device that is optically coupled to a surface of the HMD and providing at least one predetermined optical function. The device comprising a first flexible electrode and a second flexible electrode configured to provide a driving voltage to the device; a birefringent material layer coupled to the first flexible electrode and the second flexible electrode, and structurally patterned to provide the at least one predetermined optical function of the device; and a first photo-alignment (PAM) layer and a second PAM layer sandwiching the birefringent material layer. A structured pattern of the birefringent material layer is based on a manipulation of optic axis of birefringent material molecules in the birefringent material layer.

Other aspects of the present disclosure can be understood by those skilled in the art in light of the description, the claims, and the drawings of the present disclosure.

DETAILED DESCRIPTION

Figure 1A:
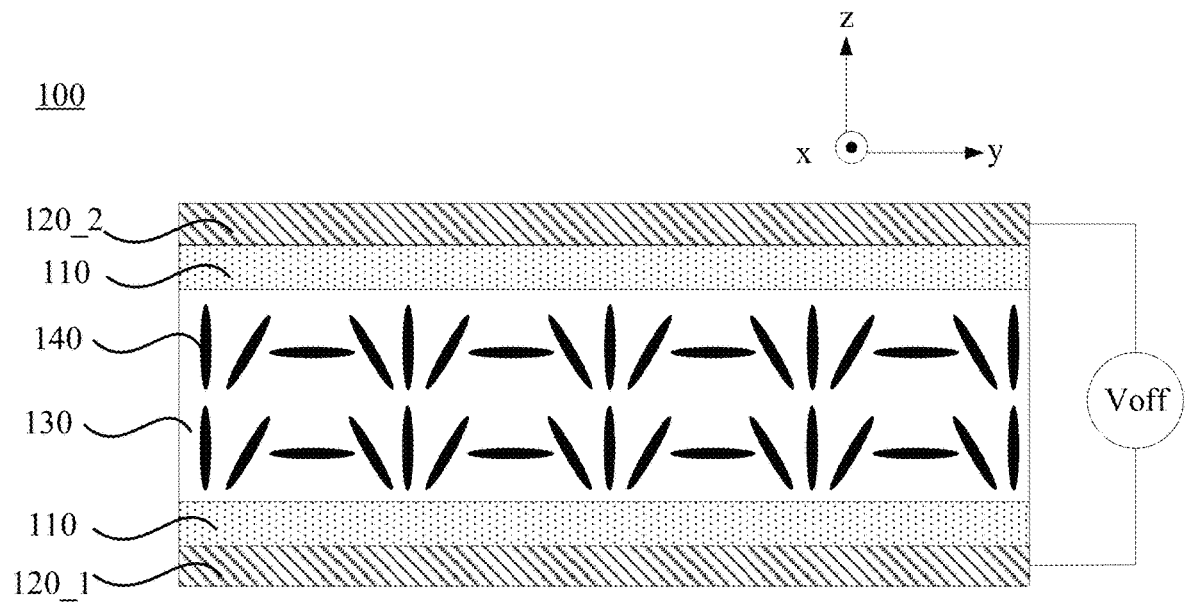
FIGS. 1A-1B illustrate an example of a liquid crystal (LC) optical device consistent with the disclosed embodiments.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Figure 1B:
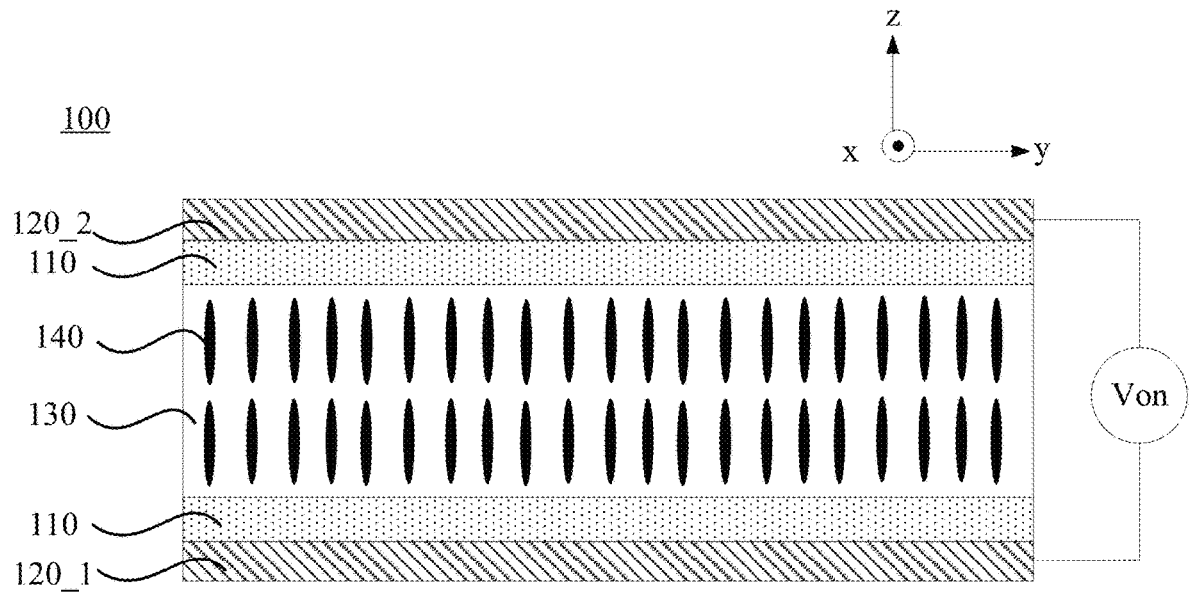

The present disclosure provides an improved liquid crystal (LC) optical device to be used in AR/VR/MR HMDs to facilitate complex display functions while maintaining a small form factor, adaptive, light efficient and light-weight. FIGS. 1A-1B illustrate an example of an LC optical device 100 consistent with the disclosed embodiments. As shown in FIGS. 1A-1B, the LC optical device 100 may comprise a first electrode 120_1 and a second electrode 120_2 arranged in opposite to each other, and a liquid crystal (LC) layer 130 sandwiched between the first electrode 120_1 and the second electrode 120_2. The first electrode 120_1 and the second electrode 120_2 may provide driving voltages to the LC layer 130. Each of the first electrode 120_1 and the second electrode 120_2 may be disposed with a photo-alignment (PAM) layer 110 which is in contact with the LC layer 130. The first electrode 120_1 and the second electrode 120_2 may provide driving voltages to the LC layer 130, and the PAM layers 110 may determine an alignment/orientation of LC molecules 140 included in the LC layer 130. The LC optical device 100 may provide at least one predetermined optical function/optical effect.

In certain embodiments, the first electrode 120_1 and the second electrode 120_2 each may be a flexible electrode, which includes a flexible transparent conductive layer, for example, indium tin oxide (ITO) disposed on a plastic film (such as polyethylene terephthalate (PET), polyethylene naphthalate (PEN)) or any appropriate flexible substrate layers, carbon nanotube electrode, etc. The flexible substrate layer may be substantially transparent in the visible band (~380 nm to 750 nm). In certain embodiments, the flexible substrate layer may also be transparent in some or all of the infrared (IR) band (~750 nm to 1 mm). In certain embodiments, the thickness of the flexible electrode may be approximately 250-500 nm.

In certain embodiments, the LC layer 130 may be a thin film of LC materials (or more broadly speaking, a thin film of birefringent materials because a reactive mesogen can also be employed). That is, more broadly speaking, the LC layer 130 may be referred as a birefringent material layer. The LC materials may include nematic LCs, twist-bend LCs, or chiral nematic LCs (or LCs with chiral dopant), etc. In certain embodiments, some functional material may also be doped in the LC materials, such as dichroic dyes. The LC materials may have positive or negative dielectric anisotropy. In certain embodiments, the LC layer 130 may further include photo-crosslinked polymers in addition to the LC materials. The photo-crosslinked polymers may improve the response time of the LC optical device 100, however, the driving voltage of the LC optical device 100 may be increased. In certain embodiments, the thickness of the LC layer 130 may be approximately 0.5-10 μm.

The LC layer 130 may be coupled to the first electrode 120_1 and the second electrode 120_2, and structurally patterned to have a certain pattern of LC molecules 140 to provide at least one predetermined optical function of the LC optical device 100. Depending on the structured pattern of the LC molecules 140 in the LC layer 130, the LC optical device 100 may function as a transmissive or reflective optical element, such as a prism, a lens, a beam refractor, a lens/prims array, a phase retarder, etc.

In the disclosed embodiments, the structured pattern of the LC molecules 140 in the LC layer 130 may be realized through aligning the LC molecules 140 on the PAM layer 110. In certain embodiments, the PAM layer 110 may be a thin film of photosensitive materials which have been patterned or uniformly aligned under light irradiation, and the thickness of the PAM layer 110 may be approximately 3-30 nm. Due to anisotropic interfacial interaction, the patterned or uniform alignment of the photosensitive materials may determine the alignment of the adjacent LC molecules 140 in the LC layer 130.

For example, the first electrode 120_1 and the second electrode 120_2 coated with the PAM layer 110 may be first assembled to form an LC cell with a certain cell gap, in which the cell gap is controlled by spacers and glue on the edge. Then the LC cell may be subjected to light (e.g., ultraviolet, violet or blue) interference exposure or uniform exposure of polarized light. After exposure of sufficient dosage, the photosensitive materials in the PAM layer 110 may be patterned or uniformly aligned, i.e., the light interference pattern or uniform light irradiation may be recorded on the PAM layers 110 of the LC cell. Then the exposed LC cell may be filled with LC materials and sealed. To fabricate the LC layer 130 which includes mixed LC materials and photo-crosslinked polymers, the exposed LC cell may be filled with a mixture of LC materials and monomers, then exposed with UV again to form cross-linked LC polymer thin film. Because of the anisotropic interfacial interaction, the patterned or uniform alignment of the photosensitive materials in the PAM layer 110 determines the alignment of the adjacent LC molecules 140 in the LC layer 130.

Due to the substantially thin thickness of the various components in the LC optical device 100, the LC optical device 100 may be a flexible optical device which is bend, curved, or rolled, etc. and, thus, may be applied where rigid optical elements may not fit, such as on curved surface or flexible structures. In addition, the LC optical device 100 may be an active optical device, i.e., a switchable optical device, which could be switched between an operating state in which the optical function is operated/activated and a non-operating state in which the optical function is erased/deactivated. In certain embodiments, the optical function of the LC optical device 100 may be activated by applying a voltage of zero (or more generally below some minimal value), and deactivated by applying a voltage of certain amplitude (or more generally above some threshold value). That is, the operating state in which the optical function is operated/activated may be realized by applying a voltage of zero (or more generally below some minimal value), and the non-operating state in which the optical function is erased/deactivated may be relayed by applying a voltage of certain amplitude (or more generally above some threshold value).

As shown in FIG. 1A, when applying a zero voltage (or more generally below some minimal value which is too small to reorient the LC molecules 140) to the LC optical device 100, the orientation and pattern of the LC molecules 140 in the LC layer 130 may be controlled by the PAM layers 110. Thus, the LC layer 130 may function as a structurally patterned waveplate which provides a predetermined optical function, such as focusing/defocusing incident light, deflecting incident light, reflecting incident light, and/or changing a polarization direction of incident light, etc. Z-direction/axis is the light prorogating direction.

As shown in FIG. 1B, when applying a voltage of certain amplitude (or more generally above some threshold value which is large enough to reorient the LC molecules 140) to the LC optical device 100, the orientation of the LC molecules 140 may be controlled by the generated electric field. In particular, under a vertical electrical field generated between the first electrode 120_1 and the second electrode 120_2, the LC molecules 140 having positive dielectric anisotropy may trend to be reoriented along the direction of the vertical electrical field, towards a direction perpendicular to a surface where the PAM layer 110 is disposed. When the amplitude of the applied voltage is large enough to reorient the LC molecules 140 to be perpendicular to the surface where the where the PAM layer 110 is disposed, the LC layer 130 may function as a homeotropic plate which can be treated as a transparent plate.

That is, generally speaking, in the absence of an electric field, the structured pattern of the LC layer may be controlled by the first and second PAM layers, and the LC optical device may be in the operating state in which the optical function is operated/activated; and in the presence of the electric field, due to the dielectric anisotropy of LC materials, the structured pattern of the LC layer may be controlled by the electric field, and the LC optical device may be in the non-operating state in which the optical function is erased/deactivated.

In FIGS. 1A-1B, the first electrode 120_1 and the second electrode 120_2 may be planar electrodes sandwiching the LC layer 130, which is for illustrative purposes and is not intended to limit the scope of the present discourse. In certain embodiments, the first electrode 120_1 and/or the second electrode 120_2 may also be patterned electrodes.

Figure 2A:
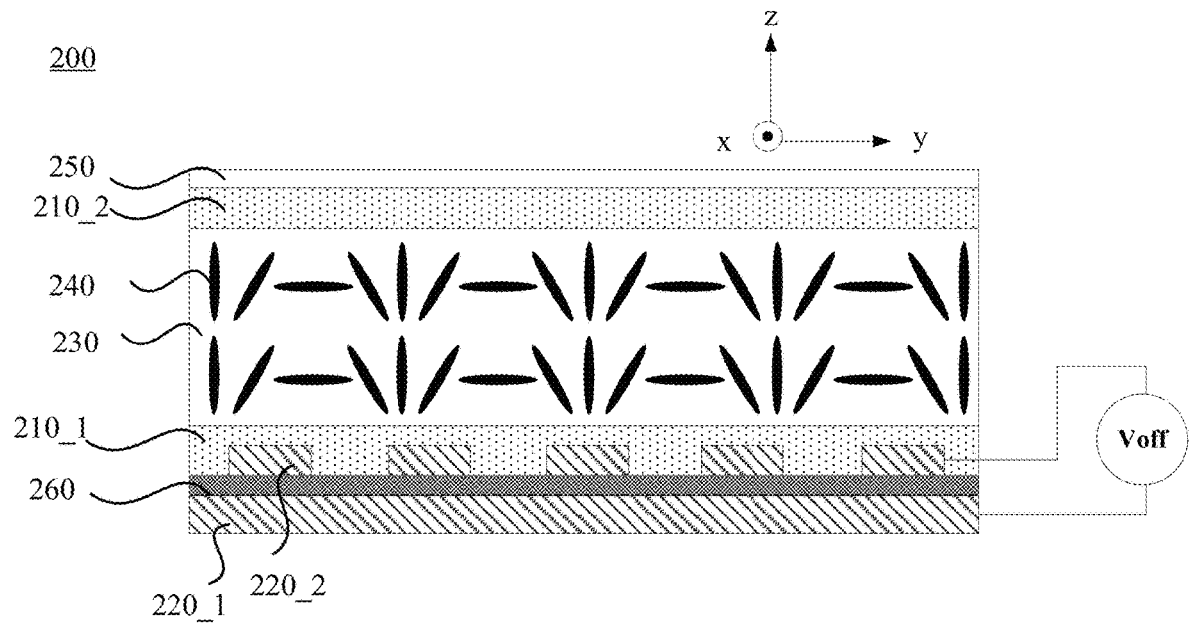
FIGS. 2A-2B illustrate another example of an LC optical device consistent with the disclosed embodiments.
Figure 2B:
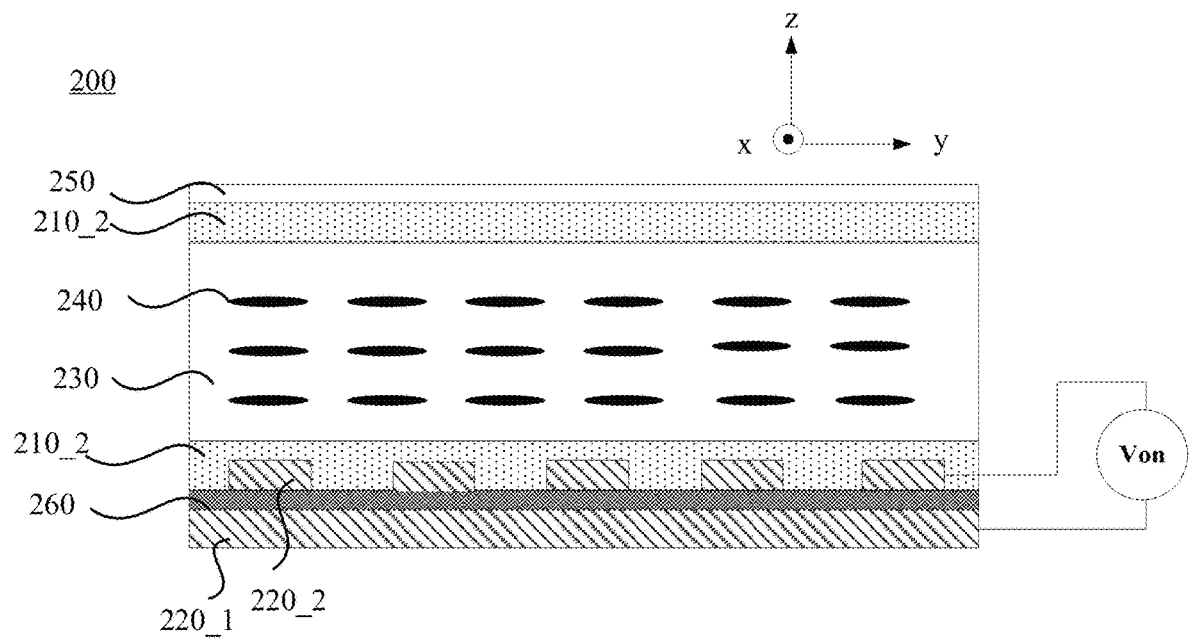

FIGS. 2A-2B illustrate another example of an LC optical device 200 consistent with the disclosed embodiments. The seminaries between FIGS. 1A-1B and FIGS. 2A-2B are not repeated here, while certain differences are further explained. As shown in FIGS. 2A-2B, the LC optical device 200 may include a substrate 250, an LC layer 230, a first electrode 220_1 and a second electrode 220_2 disposed at the same side of the LC layer 230, an insulating layer 260 disposed between the first flexible electrode 220_1 and the second flexible electrode 220_2, a first PAM layer 210_1 disposed on the second flexible electrode 220_2, and a second PAM layer 210_2 disposed on the substrate 250. The first PAM layer 210_1 and the second PAM layer 210_2 may sandwich the LC layer 230 to provide an alignment of the LC molecules 240 in the LC layer 230.

In certain embodiments, the substrate 250 may be an adhesives layer 250 which is configured to provide flexible feature and additional protection. In addition, the refractive index of the adhesives layer 250 may be adjusted, such that the adhesives layer 250 may be configured as an index-matching layer or index-mismatching layer for diverse optical design purposes. In certain embodiments, the adhesives layer 250 may be an ultraviolet (UV) curable isotropic adhesives layer. In certain embodiments, the thickness of the adhesives layer 250 may be approximately 1-60 μm.

The first flexible electrode 220_1 and the second flexible electrode 220_2 may be flexible electrodes. In certain embodiments, the first electrode 220_1 may be a planar electrode, and the second electrode 220_2 may be a patterned electrode which includes a plurality of parallel striped electrodes extending in an x-direction.

Similar to the LC optical device 100 in FIG. 1A, as shown FIG. 2A, when applying a zero voltage (or more generally below some minimal value which is too small to reorient the LC molecules 240) to the LC optical device 200, the orientation and pattern of the LC molecules 240 in the LC layer 230 may be controlled by the PAM layers 210_1 and 210_2, and the LC layer 230 may function as a structurally patterned waveplate which provides a predetermined optical function.

When applying a voltage of certain amplitude (or more generally above some threshold value which is large enough to reorient the LC molecules 240) to the LC optical device 200, the orientation of the LC molecules 240 in the LC layer 230 may be controlled by the generated electric field. Different from the LC optical device 100 in FIG. 1B, as shown in FIG. 2B, a horizontal electric field may be generated, and the LC molecules 240 having positive dielectric anisotropy may trend to be reoriented along the direction of the horizontal electrical field, towards a direction parallel to a surface where the first PAM layer 220_1 is disposed. When the amplitude of the applied voltage is large enough to reorient the LC molecules 240 to be parallel to the surface where the first PAM layer 220_1 is disposed, the LC layer 230 may function as a homogeneous plate which can be treated as a transparent plate. In certain embodiments, such a homogeneous plate with uniform in-plane alignment may act as a half waveplate, which changes the polarization of transmitted light.

For illustrative purposes, FIGS. 1A-2B merely show the orientation of the LC molecules having positive dielectric anisotropy. In certain embodiments, the LC molecules may have negative dielectric anisotropy, then the generated vertical electric field may enable the LC molecules in the LC layer to be reoriented towards a direction parallel to a surface where the PAM layer is disposed, while the generated horizontal electric field may enable the LC molecules in the LC layer to be reoriented towards a direction perpendicular to the surface where the PAM layer is disposed.

In addition, for illustrative purposes, FIGS. 1A-2B show the LC optical device includes two PAM layers which have been patterned or uniform aligned, however, in certain embodiments, the LC optical device may only include one PAM layer which is in contact with the LC layer and has have been patterned or uniform aligned. In certain other embodiments, the LC optical device may only include two PAM layers which are in contact with the LC layer, but only one PAM layer has been patterned or uniform aligned.

Figure 3:
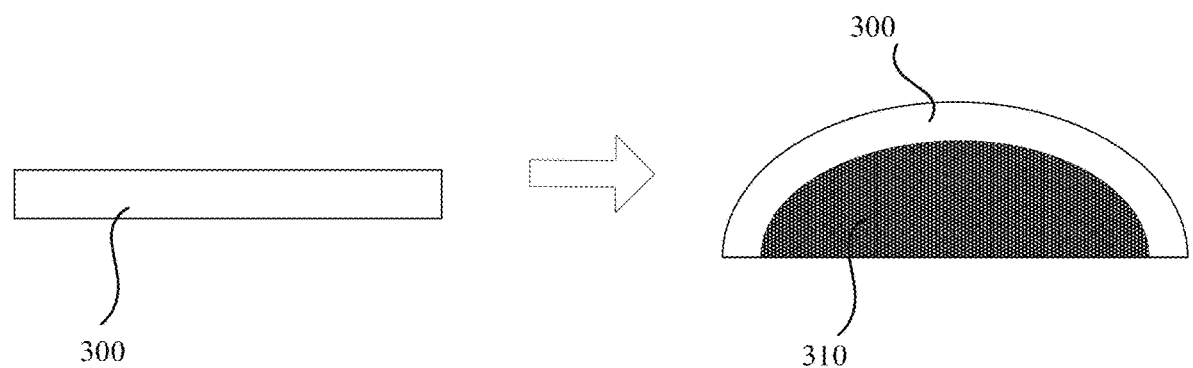
FIG. 3 illustrates an application example of an LC optical device consistent with the disclosed embodiments.

FIG. 3 illustrate an application example of an LC optical device 300 consistent with the disclosed embodiments. As shown in FIG. 3, as a flexible device of substantially thin thickness, the LC optical device 300 can be bend, curved, or rolled, etc. Thus, the LC optical device 300 may be applied where rigid optical elements do not fit, such as on a curved surface 310 or a flexible structure 310. Further, the LC optical device 300 may be attached to any appropriate surface without affecting the optical function, or multiple LC optical devices 300 may be stacked together or optically coupled together to form optical series.

Meanwhile, as discussed above, the optical function of the LC optical device 300 may be realized by the structured pattern of the LC molecules in the LC layer, according to which the LC optical device 300 may function as a transmissive or reflective optical element, such as a prism, a lens, a beam deflector, a lens/prims array, a phase retarder, etc. In addition, the LC optical devices 300 may be an active device which is switchable between an operating state in which the optical function is operated/activated and a non-operating state in which the optical function is erased/deactivated, for example, through switching an applied voltage. All these features of the LC optical device 300 may open the possibilities to adaptive, light efficient, light-weight and customized optical elements.

Further, after attached to (e.g., optically coupled to) any appropriate surface in the AR/VR/MR HMDs, the LC optical device 300 may be used as multifunctional optical components in the AR/VR/MR HMDs, such as eye-tracking components, accommodation components for multiple focus or variable focus, display resolution enhancement components, pupil steering elements, and a broadband waveplate (e.g. quarter wave-plate or half wave-plate) as a polarization management component, etc., which may significantly reduce the weight and enhance the appearance of the AR/VR/MR HMDs, therefore opening the possibilities to the futuristic smart glasses.

Returning to FIGS. 1A-1B, in certain embodiments, the optical function of the LC optical device 100 (i.e., the structured pattern of LC molecules 130) may be based on the manipulation of the optic axis of the LC molecules 140 in the LC layer 130. Such LC optical devices are generally called as Pancharatnam Berry Phase (PBP) elements, geometric phase (GP) elements, cycloidal diffractive waveplate (CDW), polarization elements, polarization volume elements, or polarization volume hologram (PVH) elements. In certain embodiments, the manipulation of the optic axis of the LC molecules 140 in the LC layer 130 may be realized by aligning the LC molecules in the LC layer on a patterned or uniform aligned PAM layer 110.

Various designs of the LC optical devices are discussed below, in which the LC materials may have positive dielectric anisotropy and the electrodes may be planar electrodes. It should be noted that these designs are merely illustrative, and other designs of the LC optical devices may be generated using the principles described in the present discourse.

Figure 4A:
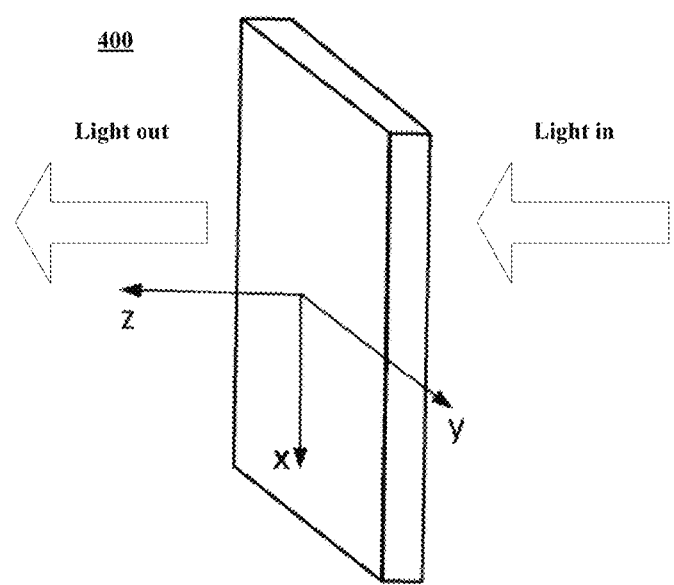
FIG. 4A illustrates an example of a transmissive LC optical device consistent with the disclosed embodiments.

FIG. 4A is an example of a transmissive LC optical device 400 consistent with the disclosed embodiments. According to the structured pattern of the LC molecules (i.e., LC orientation) in the LC layer, the LC optical device 400 may function as a transmissive optical element, such as a prism, a lens, a beam deflector, a lens/prims array, a phase retarder, etc. Z-direction/axis is the light prorogating direction.

Figure 4B:
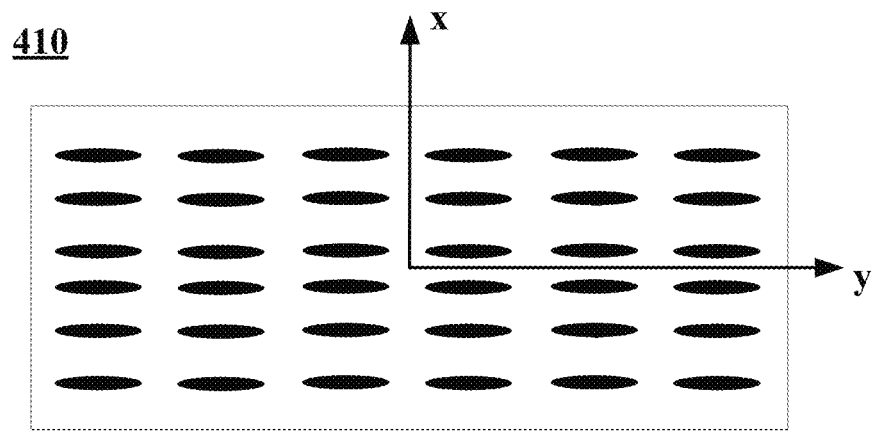
FIG. 4B illustrates an example of LC orientations when the LC optical device in FIG. 4A is an LC phase retarder consistent with the disclosed embodiments.

FIG. 4B illustrates an example of LC orientations when the LC optical device in FIG. 4A is an LC phase retarder 410 consistent with the disclosed embodiments. As shown in FIG. 4B, the optic axes of the LC molecules may have a uniform orientation across the entire LC phase retarder 410, which may be realized by aligning the LC molecules on a uniform aligned PAM layer. When the LC phase retarder 410 is applied with a zero voltage (or more generally below some minimal value which is too small to reorient the LC molecules), the alignment of the LC molecules may be controlled by the uniform aligned PAM layer.

When the LC phase retarder 410 is an active optical device, the LC phase retarder 410 may allow an active control of the phase of the transmitted light. LC phase retarders are often used instead of conventional wave plates, because LC phase retarders can be precisely tuned to retard the transmitted light by up to half of a wavelength over a broad spectral range. To merely change the phase of the transmitted light, linearly polarized incident light may be configured to have its polarization axis aligned with the optical axis of the LC phase retarder 410. As the applied voltage gradually increases, the phase offset of the transmitted light may be gradually decreased.

In addition, the LC phase retarder 410 may also be effectively used as a polarization management component. When using the LC phase retarder 410 to control the polarization of incident light, the polarization axis of the linearly polarized incident light may be oriented at a 45° angle with respect to the optical axis of the LC phase retarder 410. For example, when the LC phase retarder 410 is a half waveplate applied with a zero voltage (or more generally below some minimal value which is too small to reorient the LC molecules), the linearly polarized incident light having a first polarization direction may be converted to linearly polarized transmitted light having a second first polarization direction perpendicular to the first polarization direction, while circularly polarized incident light may be converted to circularly polarized transmitted light having a reversed handedness. When the LC phase retarder 410 is a quarter waveplate applied with a zero voltage (or more generally below some minimal value which is too small to reorient the LC molecules), the linearly polarized incident light may be converted to circularly polarized transmitted light.

When the LC phase retarder 410 is applied with a sufficient high voltage, the LC molecules having positive dielectric anisotropy may be reoriented to be aligned with the generated electric field. Accordingly, the LC phase retarder 410 may function as a homeotropic plate which can be treated as a transparent plate without providing any phase and polarization change to the transmitted light.

Figure 4C:
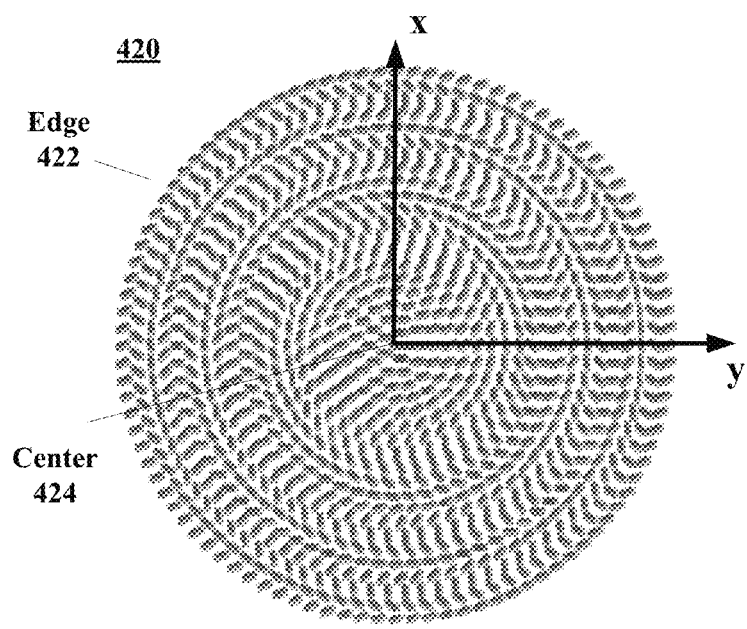
FIG. 4C illustrates an example of LC orientations when the LC optical device in FIG. 4A is a Pancharatnam Berry Phase (PBP) LC lens consistent with the disclosed embodiments.

FIG. 4C illustrates an example of LC orientations when the LC optical device in FIG. 4A is a PBP LC lens 420. As shown in FIG. 4C, the PBP LC lens 420 may create a respective lens profile via an in-plane orientation (azimuth angle $\theta$) of the LC molecules, in which the phase difference $T=2\theta$. The azimuth angles of LC molecules may be continuously changed from a center 424 to an edge 422 of the PBP LC lens 420, with a varied pitch $\Lambda$. Pitch is defined in a way that the azimuth angle of the LC molecule is rotated by 180° from the initial state. In contrast, a conventional LC lens creates a lens profile via a birefringence ($\Delta n$) and layer thickness (d) of liquid crystals, and a number (#) of Fresnel zones (if it is Fresnel lens design), in which the phase difference $T=d\Delta n*\#*2\lambda/\lambda$. Accordingly, the PBP LC lens 420 may have a large aperture size and may be made with a very thin LC layer, which allows fast switching speed to turn the lens power on/off.

Figure 4D:
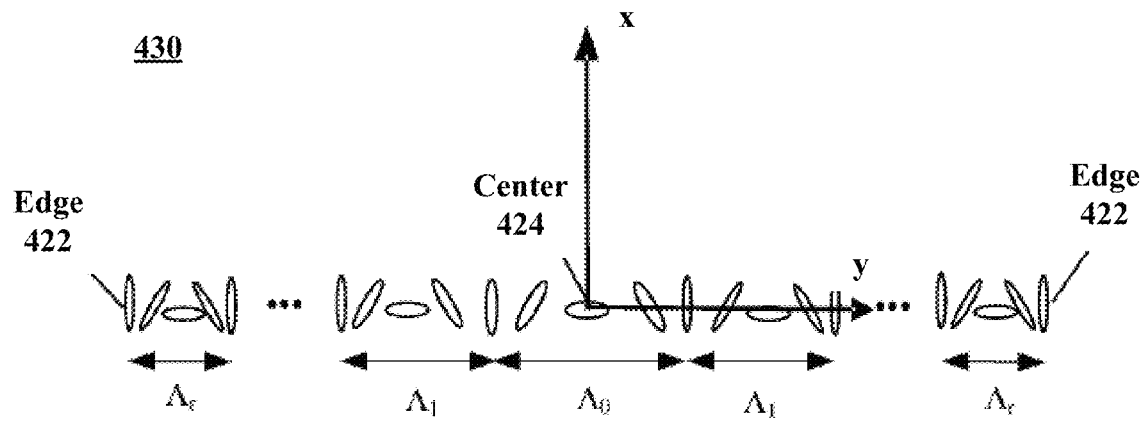
FIG. 4D illustrates a portion of LC orientations in the PBP LC lens in FIG. 4C consistent with the disclosed embodiments.

FIG. 4D is a section of LC orientations 430 taken along y-axis in the PBP LC lens 420 of FIG. 4C. As shown in FIG. 4D, from the liquid crystal orientation 430, a rate of pitch variation may be a function of distance from the lens center 424. The rate of pitch variation may increase with the distance from the lens center 424. For example, the pitch at the lens center 424 ($\Lambda_0$) is the largest, and the pitch at the edge 422 ($\Lambda_r$) is the smallest, i.e., $\Lambda_0 > \Lambda_1 > \ldots > \Lambda_r$. In the x-y plane, to make a PBP LC lens with lens radius (r) and lens power (+/−f), the azimuth angle $\theta$ may satisfy $\Lambda = r^2/2f*(\pi/\lambda)$, where $\lambda$ is the wavelength of incident light.

Further, an active PBP element has three optical states: an additive state, a neutral state, and a subtractive state, in which the additive state and the subtractive state are operating states in which the optical function is operated/activated, and the neutral state is non-operating state in which the optical function is erased/deactivated. The state of the active PBP element is determined by the by the handedness of circularly polarized light incident on the active PBP element and an applied voltage. In certain embodiments, the active PBP element may operate in a subtractive state responsive to incident light with a left-handed circular polarization and an applied voltage of zero (or more generally below some minimal value), operate in an additive state responsive to incident light with a right-handed circular polarization and the applied voltage of zero (or more generally below some minimal value), and operate in a neutral state (regardless of polarization) responsive to an applied voltage larger than a threshold voltage which aligns LCs having positive dielectric anisotropy along with the electric field.

When the PBP LC lens 420 shown in FIG. 4C is an active PBP LC lens, the PBP LC lens 420 may have three discrete focal states (also referred to as optical states). The three optical states are an additive state, a neutral state, and a subtractive state, in which the additive state and the subtractive state are operating states in which the optical function is operated/activated, and the neutral state is non-operating state in which the optical function is erased/deactivated. In particular, the additive state may add optical power to the system (i.e., has a positive focus of 'f'), and the subtractive state may subtract optical power from the system (i.e., has a negative focus of '−f'). When not in the neutral state, the active PBP LC lens 420 may reverse the handedness of circularly polarized light passing through the PBP LC lens 420 in addition to focusing/defocusing the incident light. The neutral state may neither affect the optical power of the system nor affect the polarization of light passing through the PBP LC lens 420.

The optical state of the active PBP LC lens 420 is determined by the by the handedness of circularly polarized light incident on the active PBP LC lens and an applied voltage. In certain embodiments, the active PBP LC lens 420 may operate in a subtractive state that removes optical power to the system in response to incident light with a left-handed circular polarization and an applied voltage of zero (or more generally below some minimal value), operate in an additive state that adds optical power to the system in response to incident light with a right-handed circular polarization and the applied voltage of zero (or more generally below some minimal value), and operate in a neutral state (regardless of polarization) that does not affect the optical power of the system in response to an applied voltage larger than a threshold voltage which aligns LCs having positive dielectric anisotropy along with the electric field.

Design specifications for HMDs used for VR, AR, or MR applications typically requires a large range of optical power to adapt for human eye vergence-accommodation (e.g., ~±2 Diopters or more), fast switching speeds (e.g., ~300 ms), and a good quality image. Note conventional LC lenses may be not well suited to these applications, because a conventional LC lens generally would require the LC materials to have a relatively high index of refraction or be relatively thick (which reduces switching speeds). In contrast, the PBP LC lens 420 is able to meet design specs using LC materials having a relatively low index of refraction and, moreover, the PBP LC lens 420 is thin (e.g., a single liquid crystal layer can be ~2 μm) and has high switching speeds (e.g., 300 ms).

Figure 4E:
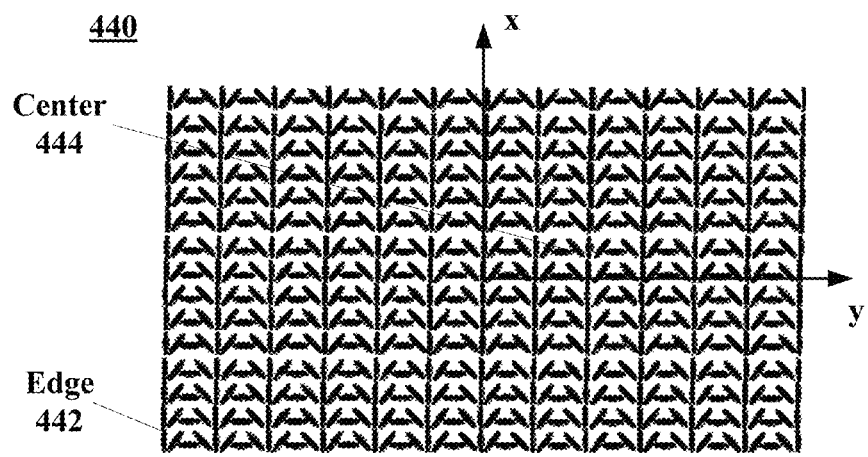
FIG. 4E illustrates an example of LC orientations when the LC optical device in FIG. 4A is a PBP LC deflector consistent with the disclosed embodiments.
Figure 4F:
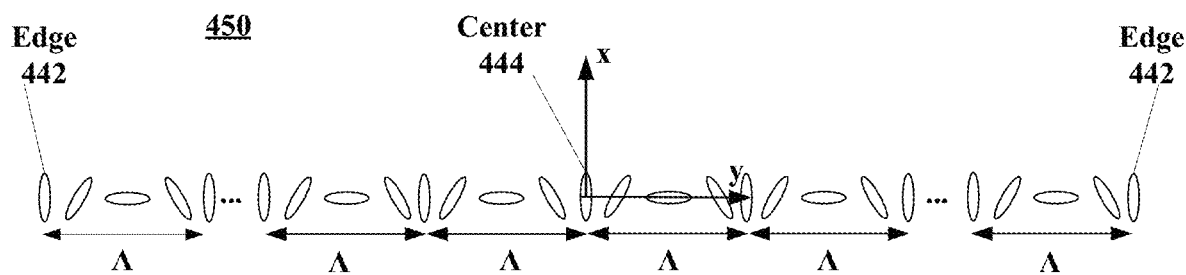
FIG. 4F illustrates a portion of LC orientations in the PBP LC deflector in FIG. 4E consistent with the disclosed embodiments.

FIG. 4E illustrates an example of LC orientations when the LC optical device in FIG. 4A is a PBP LC deflector 440, and FIG. 4F shows a section of LC orientations 450 taken along y-axis in the PBP LC deflector 440 in FIG. 4E. As shown in FIGS. 4E-4F, the PBP LC deflector 440 may be a PBP LC grating with a period structure, in which the azimuth angles of the LC molecules may be changed in a linearly repetitive pattern from a center 444 to an edge 442 of the PBP LC deflector 440, with a uniform pitch $\Lambda$. The pitch $\Lambda$ of the PBP LC deflector 440 may be half the distance along the y-axis between repeated portions of the pattern. The pitch $\Lambda$ may determine, in part, the optical properties of PBP LC deflector 440. For example, circularly polarized light incident onto the PBP LC deflector 440 may have a beam deflector output comprising primary, conjugate, and leakage light respectively corresponding to diffraction orders m=+1, −1, and zero. The pitch $\Lambda$ may determine the diffraction angles (e.g., beam-steering angles) of the light in the different diffraction orders. Generally, the smaller the pitch $\Lambda$, the larger the diffraction angle for a given wavelength of light.

The PBP LC deflector 440 shown in FIG. 4E may be an active PBP LC deflector which has three optical states: an additive state, a neutral state, and a subtractive state. In the additive state, the active PBP LC deflector 440 may diffract light of a particular wavelength to an angle that is positive relative to the diffraction angle of the subtractive state, e.g., a positive diffraction angle. In the subtractive state, the active PBP LC deflector 440 may diffract light at a particular wavelength to an angle that is negative relative to the positive angle of the additive state, e.g., a negative diffraction angle. When not in the neutral state, the PBP LC deflector 440 may reverse the handedness of circularly polarized light passing through the PBP LC deflector 440 in addition to deflecting the incident light. In the neutral state, the PBP LC deflector 440 may neither lead to a light diffraction nor affect the polarization of the light passing through the PBP LC deflector 440.

Similarly, the optical state of the PBP LC deflector 440 may be determined by the by the handedness of circularly polarized light incident on the active PBP LC deflector 440 and an applied voltage. In certain embodiments, the PBP LC deflector 440 may operate in a subtractive state that diffracts light at a particular wavelength to a negative diffraction angle in response to incident light with a left-handed circular polarization and an applied voltage of zero (or more generally below some minimal value), operate in an additive state that that diffracts light at a particular wavelength to a positive diffraction angle in response to incident light with a right-handed circular polarization and the applied voltage of zero (or more generally below some minimal value), and operate in a neutral state (regardless of polarization) that does not deflect the incident light in response to an applied voltage larger than a threshold voltage which aligns LCs having positive dielectric anisotropy along with the electric field.

Returning to FIG. 4A, in certain embodiments, the LC optical device 400 may have a twisted or non-twisted structure, for example, through adopting chiral nematic LCs (or LCs with chiral dopant) in the LC layer. For example, along with the light propagation direction (i.e., z-direction) in the LC optical device 400, a dual-twisted or multiple-twisted structure layer may offer achromatic performance on efficiency in the LC optical device 400. Along with the light propagation direction (i.e., z-direction) in the LC optical device 400, the non-twisted structure may be simpler to fabricate than a twisted structure, however, the non-twisted structure may be merely optimized for monochromatic light.

Figure 4G:
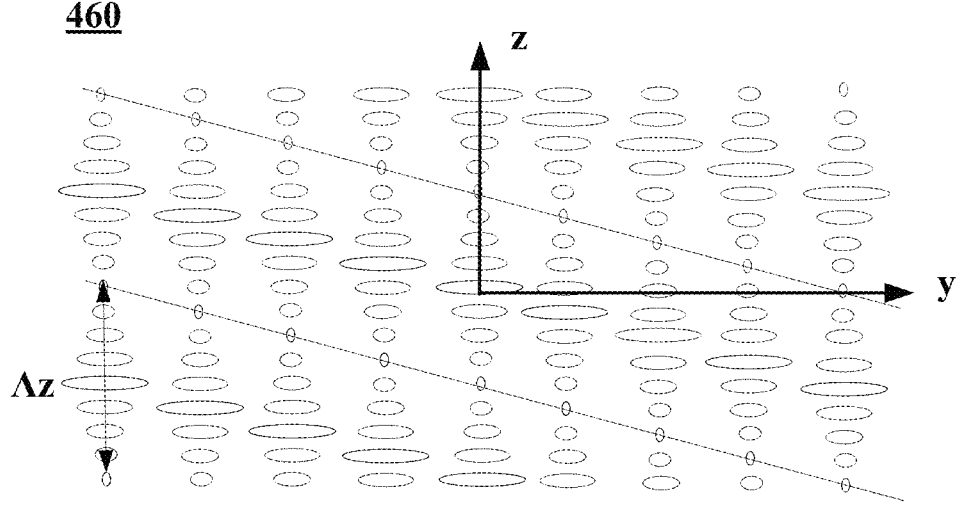
FIG. 4G illustrates an example of LC orientations when the PBP LC deflector in FIG. 4E has a dual-twisted structure consistent with the disclosed embodiments.

FIG. 4G shows an example of LC orientations 460 when the PBP LC deflector 440 in FIG. 4E has a dual-twisted structure. As shown in FIG. 4G, the directors of the LC molecules along the y-axis may be the same as a non-twisted PBP LC deflector shown in FIG. 4F. However, along z-direction, the directors of the LC molecules may twist to a certain degree from the bottom to half away across the LC layer, then twist back through the top. That is, the vertical pitch $\Lambda z$ may be half the thickness of the LC layer.

Compared to various beam deflectors used in existing HMDs, such as surface-relief beam deflectors (SRGs) and holographic beam deflectors (HGs), the PBP LC deflector 440 may have high efficiency over a large field of view and wide spectral width and, thus, may provide great advantages for waveguide-coupling HMDs used for VR, AR, or MR applications. Further, the PBP LC deflector having the dual-twisted structure may offer achromatized efficiency across all visible wavelength.

Figure 5A:
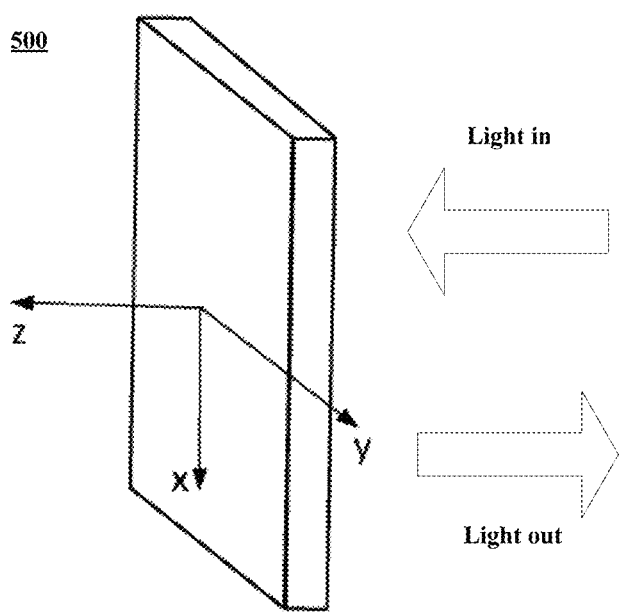
FIG. 5A illustrates an example of a reflective LC optical device consistent with the disclosed embodiments.
Figure 5B:
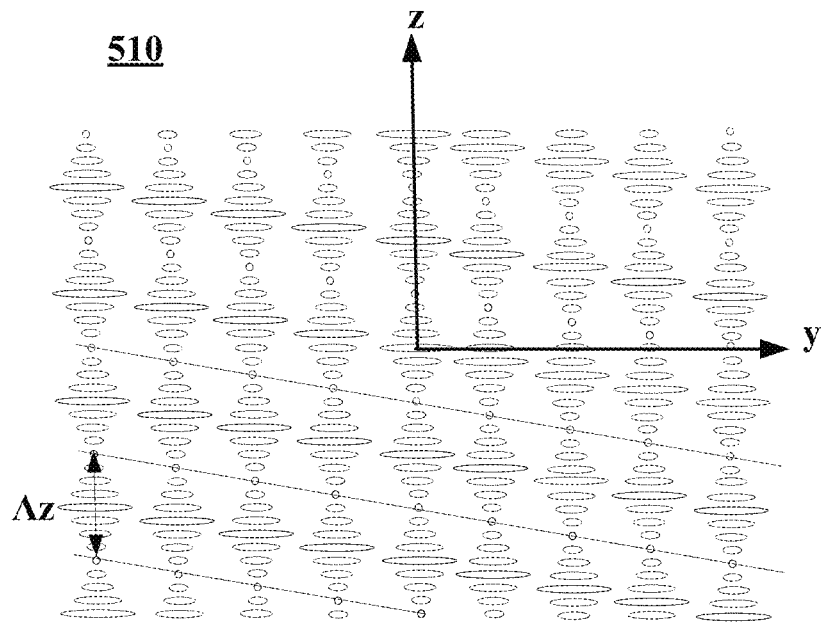
FIG. 5B illustrates an example of LC orientations when the LC optical device in FIG. 5A is a reflective PBP LC deflector consistent with the disclosed embodiments.

In addition to the transmissive LC optical devices shown in FIGS. 4A-4G, reflective LC optical devices may also be realized. FIG. 5A illustrates an example of a reflective LC optical device 500 consistent with the disclosed embodiments, and FIG. 5B illustrates an example of LC orientations 510 when the LC optical device in FIG. 5A is a reflective PBP LC deflector consistent with the disclosed embodiments.

The reflective PBP LC deflector, due to its physical properties, is also referred as a reflective polarization volume beam deflector (RPVG). As shown in FIG. 5B, in the RPVG 500, the LC molecules may be aligned in a helical twist with helix axis along the z-direction. In particular, the RPVG 500 may incorporate a higher degree of twist along z-direction (i.e., much smaller vertical pitch $\Lambda z$) than the dual-twisted transmissive PBP LC deflector shown in FIG. 4G.

Although the device structure of the RPVG 500 is somewhat similar to that of the dual-twisted transmissive PBP LC deflector shown in FIG. 4G, the deflection mechanism is different. Instead of modulating the phase of input light, the RPVG 500 deflects light through Bragg reflection (or slanted multiplayer reflection). To establish the Bragg diffraction, the film thickness (i.e., the thickness of the LC layer in the z-direction) has to be thick enough, for example, a few microns thickness. Further, the difference between the reflective PBP LC deflector (i.e., the RPVG) 500 and the transmissive PBP LC deflector manifests when considering the diffraction efficiency as a function of the film thickness. For the dual-twisted transmissive PBP LC deflector shown in FIG. 4G, the diffraction efficiency drops as the film thickness increases over the first optimal thickness. However, for the reflective PBP LC deflector (i.e., the RPVG) 500 shown in FIG. 5A, the diffraction efficiency increases monotonically with thickness and then gradually saturates.

The RPVG 500 may be an active device capable of being switched between an operating state and a non-operating state. In the operating state where a voltage applied to the RPVG 500 is zero (or more generally below some minimal value), the RPVG 500 may only deflect (i.e., reflect) circularly polarized light having the same handedness as the helical twist, but fully transmit light having the other polarization directions, without changing the polarization. For example, when the incident circularly polarized light has a reversed handedness to the helical twist of the RPVG 500, it will transmit to the 0-th order without changing the polarization.

In the non-operating state where a voltage applied to the RPVG 500 is larger than a threshold voltage, the LC molecules having positive dielectric anisotropy may be reoriented to be aligned with the generated electric field, erasing the grating pattern. That is, the RPVG 500 may function as a transparent plate, and the incident light may be fully transmitted.

Similarly, as compared to the surface-relief beam deflectors (SRGs) and holographic beam deflectors (HGs) used in existing HMDs, the RPVG 500 may exhibit high efficiency with large reflection bandwidth and large diffraction angle, which would benefit many applications such as enlarging the field of view for near-eye display applications. Further, because of the polarization selectivity of the RPVG 500, i.e., the RPVG 500 allows deflection only for one circularly polarized light while light having the other polarization will transmit through, high transmission may be achieved for an unpolarized incident beam. For example, when the RPVG 500 is used as a combiner which integrates the displayed images and the real world in AR and MR HMDs, the overall transmittance of the real-world light may be significantly increased.

Figure 6A:
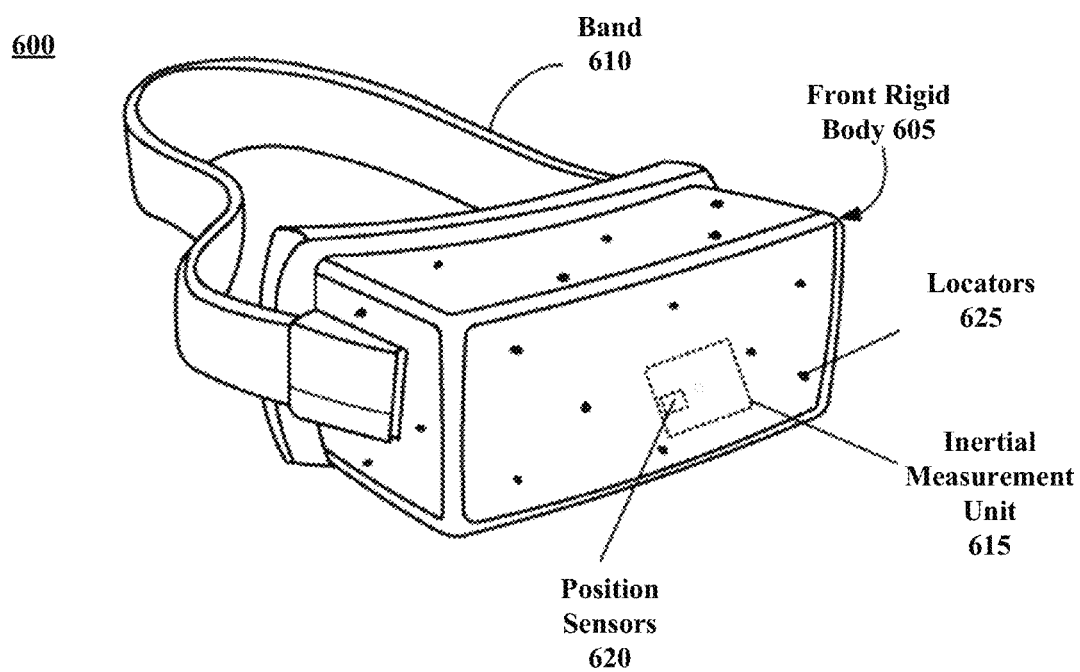
FIG. 6A illustrates a diagram of an embodiment of a head-mounted display consistent with the disclosed embodiments.
Figure 6B:
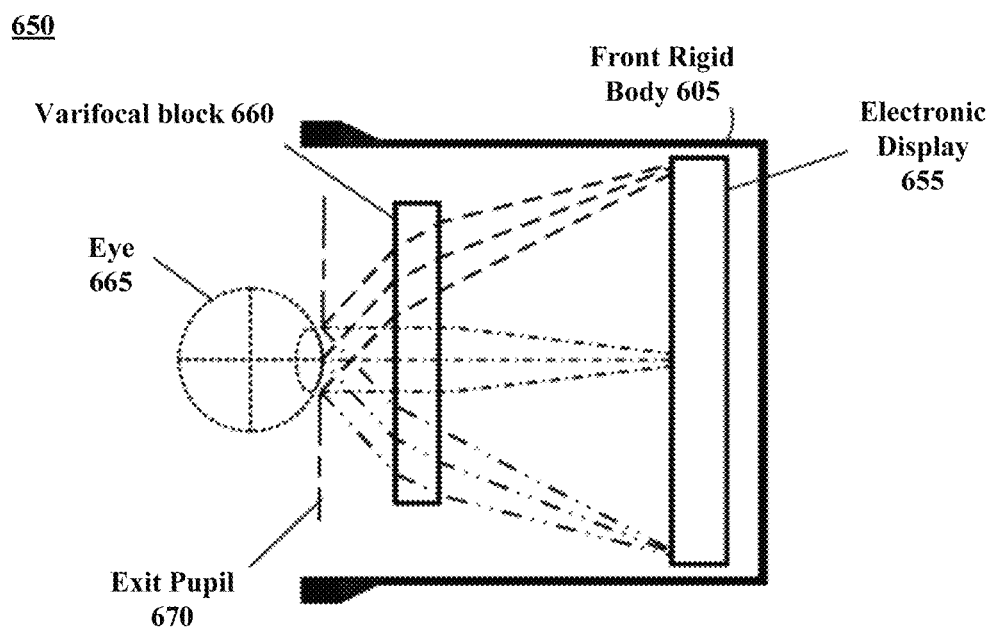
FIG. 6B illustrates a cross section of a front rigid body of the head-mounted display in FIG. 6A consistent with the disclosed embodiments.

FIG. 6A illustrates a diagram of an embodiment of a head-mounted display 600 consistent with the disclosed embodiments, and FIG. 6B illustrates a cross section 650 of a front rigid body of the head-mounted display in FIG. 6A consistent with the disclosed embodiments. The head-mounted display 600 may comprise one or more of the disclosed transferrable and flexible thin-film optical devices.

As shown in FIG. 6A, the HMD 600 may include a front rigid body 605 and a band 610. The front rigid body 605 may include one or more electronic display elements of an electronic display (not shown), an inertial measurement unit (IMU) 615, one or more position sensors 620, and locators 625. In the embodiment shown by FIG. 6A, the position sensors 620 may be located within the IMU 615, and neither the IMU 615 nor the position sensors 620 may be visible to the user. The IMU 615, the position sensors 620, and the locators 625. The HMD 600 may act as a VR or AR or MR device, when the HMD 600 acts as an AR or MR device, portions of the HMD 600 and its internal components may be at least partially transparent.

As shown in FIG. 6B, the front rigid body 605 may include an electronic display 655 and a varifocal block 660 that together provide image light to an exit pupil 670. The exit pupil 670 may be the location of the front rigid body 605 where a user's eye 665 is positioned. For purposes of illustration, FIG. 6B shows a cross section 650 associated with a single eye 665, but another varifocal block 660, separate from the varifocal block 660, provides altered image light to another eye of the user. Additionally, the HMD 600 may include an eye tracking system (not shown). The eye tracking system may include, e.g., one or more sources that illuminate one or both eyes of the user, and one or more cameras that captures images of one or both eyes of the user.

The electronic display 655 may display images to the user. In certain embodiments, the electronic display 655 may include a waveguide display or a stacked waveguide display for each eye 665 of the user. For example, the stacked waveguide display may be a polychromatic display (e.g., a red-green-blue (RGB) display) created by stacking waveguide displays whose respective monochromatic sources are of different colors. The waveguide display may include a source assembly which generates image light and an output waveguide which outputs expanded image light to the eye 665 of the user. The output waveguide may include one or more coupling element for coupling light from the source assembly into the output waveguide, decoupling element for decoupling light from the output waveguide to the eye 665 of the user, and directing element for directing light from the coupling element to the decoupling element.

In the disclosed embodiments, the coupling element, directing element and decoupling element may be realized by the disclosed active and flexible LC optical devices with a corresponding structured LC pattern, such as the PBP LC deflector shown in FIG. 4E. In addition, in the HMDs for AR and MR applications, an extra combiner which integrates the displayed images and the real world in AR HMDs may be required. The combiner may also be realized by the disclosed active and flexible LC optical device, such as the RPVG 500 shown in FIG. 5B, which may not only provide high efficiency with large reflection bandwidth and large diffraction angle but also enhance the overall transmittance of the real-world light.

Further, the varifocal block 660 may adjust a distance of light emitted from the electronic display 655, such that it appears at particular focal distances from the user. The varifocal block 660 may include one or more varifocal structures in optical series. A varifocal structure is an optical device that is configured to dynamically adjust its focus in accordance with instructions from a varifocal system. The varifocal structure may include conventional lenses with fixed optical power and/or variable lenses with adjustable optical power, which may be realized by the disclosed active and flexible LC optical devices with a corresponding structured LC pattern, such as the PBP LC lens shown in FIG. 4C. The varifocal structure may also include one or more polarization management components which control the handedness of the circularly polarized light incident onto the PBP LC lens, and the polarization management components may also be realized by the disclosed active and flexible LC optical devices with a corresponding structured LC pattern, such as the LC phase retarder shown in FIG. 4B.

In addition, in certain embodiments, the varifocal block 660 may magnify received light, correct optical errors associated with the image light, and present the corrected image light is presented to a user of the HMD 600. The varifocal block 660 may additionally include one or more optical elements in optical series, such as an aperture, a Fresnel lens, a convex lens, a concave lens, a filter, or any other suitable optical element that affects the blurred image light, which may also be realized by the disclosed active and flexible LC optical devices with a corresponding structured LC pattern.

The above-mentioned applications of the LC optical device in the HMDs are merely for illustrative purposes. In addition, the disclosed active and flexible LC optical devices may also be used to realize eye-tracking components, display resolution enhancement components, and pupil steering elements, etc., which is not limited by the present disclosure. The LC optical devices are adaptive, light efficient, lightweight and customized optical elements and, thus, through using the LC optical devices as multifunctional optical components in the HMDs, the weight of HMDs may be significantly reduced while the appearance may be enhanced, therefore opening up the possibilities to the futuristic smart glasses.

The foregoing description of the embodiments of the disclosure have been presented for the purpose of illustration. It is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein. Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A flexible optical device, comprising:
at least one alignment layer;
a birefringent material layer including a surface in contact with the at least one alignment layer, molecules of the birefringent material layer being aligned by the at least one alignment layer in an in-plane orientation pattern having a spatially uniform pitch or a spatially varying pitch, wherein azimuthal angles of the molecules distributed along an in-plane direction at the surface change continuously, and wherein the pitch is a distance over which the azimuthal angles of the molecules change by a non-zero predetermined value in the in-plane direction; and
a first flexible electrode and a second flexible electrode coupled with the birefringent material layer and configurable to provide a driving voltage to the birefringent material layer.

2. The flexible optical device according to claim 1, wherein:
the driving voltage is controlled to switch the flexible optical device between an operating state in which at least one predetermined optical function is activated and a non-operating state in which the at least one predetermined optical function is deactivated.

3. The flexible optical device according to claim 2, wherein:
when the driving voltage is smaller than a first predetermined value, the molecules of the birefringent material layer are aligned by the at least one alignment layer, and the flexible optical device is in the operating state in which the at least one predetermined optical function is activated, and
when the driving voltage is greater than or equal to a second predetermined value, the molecules of the birefringent material layer are aligned by an electric field generated by the driving voltage, and the flexible optical device is in the non-operating state in which the at least one predetermined optical function is deactivated.

4. The flexible optical device according to claim 1, wherein:
the flexible optical device is a transmissive or reflective optical element.

5. The flexible optical device according to claim 4, wherein:
the flexible optical device is one or more of a transmissive or reflective prism, a lens, a beam deflector, a lens array, a prism array, and a phase retarder.

6. The flexible optical device according to claim 1, wherein:
the birefringent material layer includes liquid crystal (LC) materials or reactive mesogens.

7. The flexible optical device according to claim 6, wherein:
the LC materials include one of nematic LCs, twist-bend LCs, and chiral nematic LCs.

8. The flexible optical device according to claim 1, wherein:
the at least one alignment layer comprises a first alignment layer and a second alignment layer,
the first flexible electrode and the second flexible electrode are coupled with the first alignment layer and the second alignment layer, respectively, and
the birefringent material layer is sandwiched between the first flexible electrode and the second flexible electrode.

9. The flexible optical device according to claim 1, further comprising:
an insulating layer coupled with a first alignment layer and disposed between the first flexible electrode and the second flexible electrode; and
a substrate coupled with a second alignment layer,
wherein the first flexible electrode and the second flexible electrode are disposed at a same side of the birefringent material layer.

10. The flexible optical device according to claim 9, wherein:
the substrate is an adhesives layer.

11. The flexible optical device according to claim 9, wherein:
at least one of the first flexible electrode or the second flexible electrode is a patterned electrode including a plurality of striped electrodes.

12. The flexible optical device according to claim 1, wherein:
at least one of the first flexible electrode or the second flexible electrode includes a flexible transparent conductive layer disposed on a plastic film.

13. The flexible optical device according to claim 1, wherein the spatially varying pitch of the in-plane orientation pattern decreases from a center of the birefringent material layer to an edge of the birefringent material layer in the in-plane direction.

14. The flexible optical device according to claim 13, wherein the non-zero predetermined value is 180 degrees.

15. A system, comprising:
a light source configured to generate an image light; and
a flexible optical device configured to provide an optical function to process the image light, the flexible optical device comprising:
at least one alignment layer,
a birefringent material layer including a surface in contact with the at least one alignment layer, molecules of the birefringent material layer being aligned by the at least one alignment layer in an in-plane orientation pattern having a spatially uniform pitch or a spatially varying pitch, wherein azimuthal angles of the molecules distributed along an in-plane direction at the surface change continuously, and wherein the pitch is a distance over which the azimuthal angles of the molecules change by a non-zero predetermined value in the in-plane direction; and
a first flexible electrode and a second flexible electrode coupled with the birefringent material layer and configurable to provide a driving voltage to the birefringent material layer.

16. The system according to claim 15, wherein:
the driving voltage is controlled to switch the flexible optical device between an operating state in which at least one predetermined optical function is activated and a non-operating state in which the at least one predetermined optical function is deactivated.

17. The system according to claim 16, wherein:
when the driving voltage is smaller than a first predetermined value, the molecules of the birefringent material layer are aligned by the at least one alignment layer, and the flexible optical device is in the operating state in which the at least one predetermined optical function is activated, and
when the driving voltage is greater than or equal to a second predetermined value, the molecules of the birefringent material layer are aligned by an electric field generated by the driving voltage, and the flexible optical device is in the non-operating state in which the at least one predetermined optical function is deactivated.

18. The system according to claim 15, wherein:
the at least one alignment layer comprises a first alignment layer and a second alignment layer,
the first flexible electrode and the second flexible electrode are coupled with the first alignment layer and the second alignment layer, respectively; and
the birefringent material layer is disposed between the first flexible electrode and the second flexible electrode.

19. The system according to claim 15, further comprising:
an insulating layer coupled with a first alignment layer and disposed between the first flexible electrode and the second flexible electrode; and
a substrate coupled with a second alignment layer,
wherein the first flexible electrode and the second flexible electrode are disposed at a same side of the birefringent material layer.

20. The system according to claim 15, wherein the spatially varying pitch of the in-plane orientation pattern decreases from a center of the birefringent material layer to an edge of the birefringent material layer in the in-plane direction.

* * * * *